United States Patent [19]

Lin et al.

[11] Patent Number: 5,588,150
[45] Date of Patent: Dec. 24, 1996

[54] PUSH DOWN OPTIMIZATION IN A DISTRIBUTED, MULTI-DATABASE SYSTEM

[75] Inventors: Eileen T. Lin, San Jose; Yun Wang, Saratoga, both of Calif.

[73] Assignee: International Business Machines Corporation, Armonk, N.Y.

[21] Appl. No.: 310,797

[22] Filed: Sep. 29, 1994

[51] Int. Cl.$^6$ ................................................ G06F 17/30
[52] U.S. Cl. ............................ 395/601; 364/DIG. 1; 364/282.4; 364/282.1
[58] Field of Search ......................................... 395/600

[56] References Cited

U.S. PATENT DOCUMENTS

| | | | |
|---|---|---|---|
| 4,714,989 | 12/1987 | Billings | 395/700 |
| 4,714,995 | 12/1987 | Materna et al. | 395/600 |
| 4,881,166 | 11/1989 | Thompson et al. | 395/600 |
| 5,058,000 | 10/1991 | Cox et al. | 395/600 |
| 5,142,470 | 8/1992 | Bristow et al. . | |
| 5,161,158 | 11/1992 | Chakravarty et al. | 395/183.22 |
| 5,239,577 | 8/1993 | Bates et al. | 379/201 |
| 5,247,664 | 9/1993 | Thompson et al. | 395/600 |
| 5,257,366 | 10/1993 | Adair et al. | 395/600 |
| 5,278,978 | 1/1994 | Demers et al. | 395/600 |
| 5,301,302 | 4/1994 | Blackard et al. | 395/500 |
| 5,345,587 | 9/1994 | Fehskens et al. | 395/650 |
| 5,381,534 | 1/1995 | Shi | 395/200 |
| 5,475,836 | 12/1995 | Harris et al. | 395/600 |

OTHER PUBLICATIONS

Arbee L. P. Chen, *A Localized Approach to Distributed Query Processing*, Bell Communications Research, Piscataway, N.J., pp. 188–202. no date.
S. M. Deen et al., "Query Decomposition in PRECI*", *Distributed Data Sharing Systems*, Elsevier Science Publishers B.V. (North Holland), pp. 91–103, 1985.
M. Rusinkiewicz et al., "Query Transformation in Heterogeneous Distributed Database Systems", *IEEE*, pp. 300–307, 1985.
T. Yu Clement et al., "Query Processing in a Fragmented Relational Distributed System: Mermaid", *IEEE Trans. on Software Engineering*, vol. SE–11, No. 8, pp. 795–810, Aug. 1985.
M. Rusinkiewicz et al., "An Approach to Query Processing in Federated Database Systems", *Proc. of the Twentieth Annual Hawaii Intl. Conf. on System Sciences*, pp. 430–440, 1987.
S. Kang et al., "Global Query Management in Heterogeneous Distributed Database Systems", *Microprocessing and Microprogramming*, vol. 38, pp. 377–384, 1993.

*Primary Examiner*—Wayne Amsbury
*Attorney, Agent, or Firm*—Sterne, Kessler, Goldstein & Fox P.L.L.C.; Marilyn Smith Dawkins

[57] ABSTRACT

High performance query optimization in a heterogeneous distributed multi-database system. An efficient technique is disclosed to enable an interface module, located between a host computer and a back-end database system, to perform maximal query or subquery push down. That is, the interface module is configured to select either the entire query or the largest subquery(s) that can be forwarded to a single database instance within the back-end database system without extensive decomposition or extraneous commands. The interface module has stored therein a data structure having information concerning the data stored in, and the capabilities of, each of the back-end databases in the heterogeneous environment. Based on this information, the interface module determines whether a query or subquery satisfies two criteria. First, the interface module determines whether a single database instance within the heterogeneous environment contains all of the data referenced in the query or subquery. This is referred to as data coverage. Next, the interface module determines whether the same single database instance provides all the functions or capabilities needed to satisfy the query or subquery. This is referred to as function or capability coverage. If both of these criteria are met, the query or subquery can be pushed down to the single database instance.

7 Claims, 5 Drawing Sheets

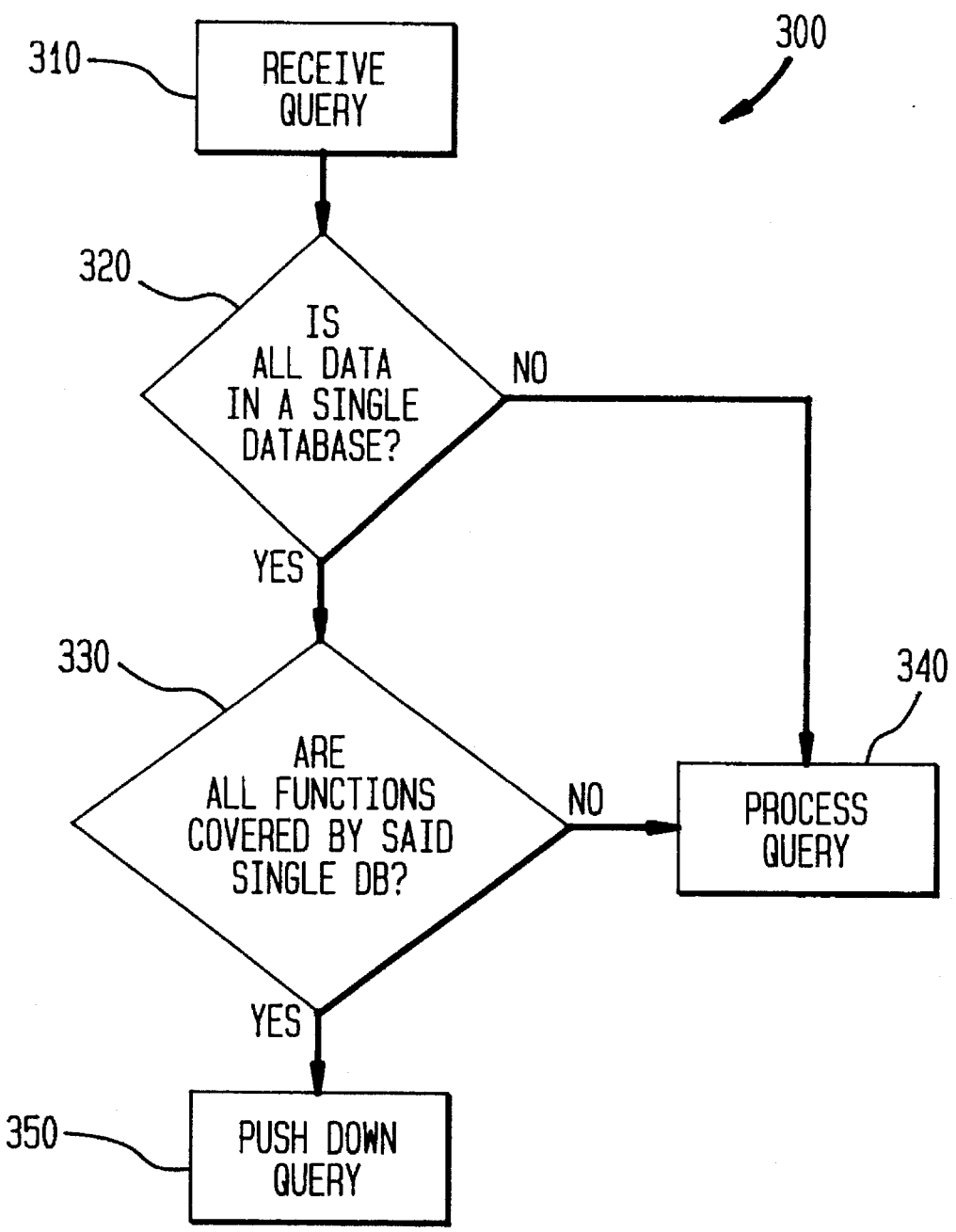

PUSH DOWN OPTIMIZATION IN A DISTRIBUTED, MULTI-DATABASE SYSTEM

CROSS-REFERENCE TO OTHER APPLICATIONS

The following applications of common assignee contain some common disclosure, and are believed to have an effective filing date identical with that of the present application:

U.S. patent application Ser. No. 08/310,799 entitled "Pass Through In a Distributed Multi-Database System", now pending.

U.S. patent application Ser. No. 08/314,644 entitled "Functional Compensation In a Heterogeneous, Distributed Database Environment", now pending, U.S. patent application Ser. No. 08/314,643 entitled "Performance Optimization In a Heterogeneous, Distributed Database Environment", abandoned.

The above-listed applications are incorporated herein by reference in their entireties.

DESCRIPTION

1. Technical Field

The present invention relates generally to computer database systems, and more particularly to an efficient technique to enable maximal subquery push down in a distributed multi-database environment.

2. Background Art

In modern data processing environments, a client's data is often distributed among a plurality of heterogeneous database systems. "Heterogeneous database systems" are database systems that have different data definition and manipulation procedures, security procedures, system management approaches, capabilities, etc. Examples of "heterogeneous database systems" include DB2 produced by International Business Machines (IBM) Corporation, Oracle produced by Oracle Corp., Sybase produced by Sybase Inc., etc. Such heterogeneous database systems, when used together, collectively represent a heterogeneous, distributed database environment (or system). Heterogeneous, distributed database systems are also sometimes called federated database systems and/or multi-database systems.

In order to enhance user-friendliness, it is preferred that clients be provided with a common interface to all of the heterogeneous database systems (also called back-end database systems, or simply back-ends). In other words, it is preferred that clients be under the illusion that they are interacting with a single back-end database system.

One conventional approach for achieving this goal is to introduce an interface module between the clients and the back-end database systems. This interface module, also called database middleware, attempts to provide to clients transparent access to the back-end database systems. Generally speaking, the interface module receives data definition and manipulation instructions from clients. The interface module translates these instructions such that they are understandable to the appropriate back-end database systems, and then transfers the translated instructions to the appropriate back-end database systems. Similarly, the interface module translates information and messages received from the back-end database systems such that they are understandable to the appropriate clients, and then transfers the translated information and messages to the appropriate clients.

Typically, the client wants to manipulate or combine data that is located within one or more of the distributed, heterogeneous database systems. To perform this task, a client sends a query to the interface module. The query defines data and indicates one or more functions to be performed on that data. Conventional interface modules do not have a mechanism to determine which functions the individual databases in the heterogeneous database system can perform. As a consequence, the interface module is required to perform all required functions. In order to perform complex functions on the data, the interface module accesses the back-end database systems and retrieves the requested data. The data is forwarded from the back-end database systems to the interface module. The interface module then performs the desired function on the returned data.

This procedure is wasteful from both a time and cost perspective. This process requires that all the data be transferred from the back-end database system to the interface module. Oftentimes, however, the function performed on the data eliminates a major portion of the original data. Consider, for example, a query that requests all employees over 65 living in California. Instead of just transferring all the employees that satisfy this query, the distributed, heterogeneous databases first transfer all employees over 65 and then transfer all employees living in California. The interface module would then perform the function of selecting the requested information from these two tables to generate the desired table. As is readily apparent this ties up the buses between the interface module and the distributed, heterogeneous databases and unnecessarily requires the interface module to perform additional functions other than its primary function of communicating with the distributed, heterogeneous databases. Furthermore, it is unnecessarily time consuming to send tables back to the interface module that are not needed to satisfy the query.

SUMMARY OF THE INVENTION

The present invention provides high performance query optimization in a heterogeneous distributed multi-database system. An efficient technique is disclosed to enable an interface module, located between a host computer and a back-end database system, to perform maximal query or subquery push down. That is, the interface module is configured to select either the entire query or the largest subqueries within the query that can be forwarded to a single database instance within the back-end database system without decomposition or extraneous commands.

The interface module has stored therein a data structure having information concerning the data stored in, and the capabilities of, each of the back-end databases in the heterogeneous environment. Based on this information, the interface module evaluates a query bottom-up to determine which subqueries within the query can be pushed down to a single database instance. Next, the query is evaluated top-down to determine the largest subquery that can be pushed down or whether the entire query can be pushed down to a single database instance.

The bottom-up evaluation of the query includes two steps. The first step determines whether a single database instance within the heterogeneous environment contains all of the data referenced in a subquery. This is referred to as data coverage. The second step determines whether the same single database instance provides all the functions or capabilities needed to satisfy the subquery. This is referred to as function or capability coverage. If both of these criteria are met, the subquery can be pushed down to the single database instance.

The top-down evaluation of the query allows the interface module to select the largest subquery that can be pushed down. Subqueries that are contained within another subquery that have been marked as push down-able are inherently push down-able. Thus, subqueries internal to a push down-able subquery do not have to be checked. Top-down evaluation ensures that the highest push down-able ancestor subquery will get pushed down together with all enclosed push down-able subqueries in the most efficient manner.

From a user's point of view, a given query may be concerned with two objects. The user does not care whether the two objects are located within a single database instance or two database instances. Conventionally, all queries would be decomposed into small pieces and then forwarded to different parts of the backend. The present invention allows certain queries or subqueries to be forwarded to the backend without extensive decomposition. That is, the present invention determines the maximal query or subquery that can be forwarded to a database instance.

Finally, executable commands are generated for the subqueries that can and cannot be pushed down. The executable commands for the subqueries that cannot be pushed down are more detailed than the executable commands for the push down-able subqueries. That is, the executable commands for the subqueries that are not push down-able may require additional assembly and glue commands (or logic).

The foregoing and other features and advantages of the invention will be apparent from the following, more particular description of a preferred embodiment of the invention, as illustrated in the accompanying drawings.

BRIEF DESCRIPTION OF DRAWINGS

FIG. 3 is a high level flow diagram of a procedure for pushing down a query to a database instance;

DETAILED DESCRIPTION OF THE PREFERRED EMBODIMENTS

1. Overview of the Present Invention

For illustrative purposes, the present invention is sometimes described herein using well known SQL concepts, statements, and syntax. As will be appreciated, SQL (structured query language) is a well known database language produced by International Business Machines (IBM) Corporation. See IBM DATABASE 2, Version 2, SQL Reference, Release 3, March 1992, available from International Business Machines of Armonk, N.Y. SQL is a standardized language for defining and manipulating data in a relational database. In accordance with the relational model of data, the database is perceived as a set of tables, relationships are represented by values in tables, and data is retrieved by specifying a result table that can be derived from one or more base tables. It should be understood, however, that reference is made to SQL for convenience purposes only. The present invention is intended and adapted to operate with database management systems which do not support SQL.

Figure 1:
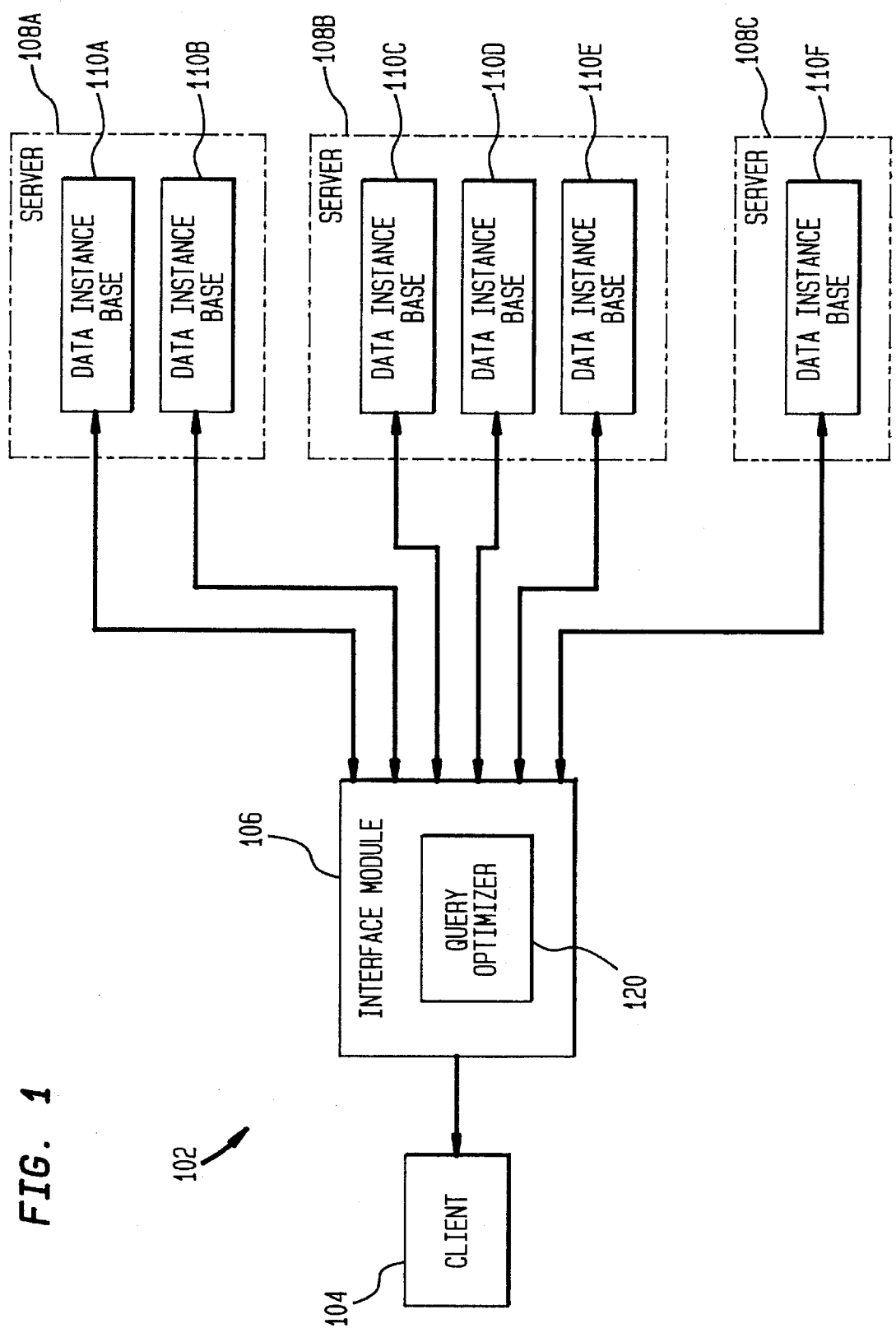
FIG. 1 is a high level block diagram of a distributed, heterogeneous database system.

FIG. 1 is a block diagram of a heterogeneous, distributed database system 102 according to a preferred embodiment of the present invention. The heterogeneous, distributed database system 102 includes one or more client application processes (also called, simply, "clients"), collectively represented by client 104.

Client 104 is connected to a plurality of instances of back-end database management systems (DBMS) (such as database instances 110A–110F) via an interface module 106, which is also called an interface module and/or database middleware. The database instances 110A–110F represent instantiations of a plurality of heterogeneous database management systems, such as DB2 produced by International Business Machines (IBM) Corporation, Oracle produced by Oracle Corp., Sybase produced by Sybase Inc., as well as other relational DBMS. Such heterogeneous database management systems may also include non-relational DBMS.

The database instances 110A–110F execute on a plurality of servers 108A–108C. In the example of FIG. 1, database instances 110A and 110B execute on server 108A, database instances 110C, 110D, and 110E execute on server 108B, and database instance 110F executes on server 108C.

The interface module 106 provides clients 104 with a common interface to all of the database instances 110A 110F (i.e., all of the back-end database systems). By operation of the interface module 106, the clients 104 are placed under the illusion that they are interacting with a single back-end database system.

Generally, the database instances 110A–110F support different sets of functions (more precisely, the database management systems from which the database instances 110A–110F were instantiated support different sets of functions) and capabilities. A function is an operation denoted by a function name followed by one or more operands (i.e., data), which in SQL are enclosed in parenthesis. The operands of functions are called arguments. Most functions have a single argument that is specified by an expression. The result of a function is a single value derived by applying the function to the result of the expression.

As should be readily apparent to those skilled in the art, a function need not be limited to the definition given above. Examples of applicable functions are inner join, outer join, set operations, etc. Oftentimes, the result of a function is a table. The term function generally has a mathematical connotation. The present invention, however, is not limited to this type of function. Rather, in addition to functions, the database instances have associated capabilities (e.g., determination of date or time) for performing a wide range of tasks. Functions are a subset of the broader category of database capabilities. The term function and capability are used interchangeably within this document.

2. Preferred Structure of the Present Invention

Figure 2:
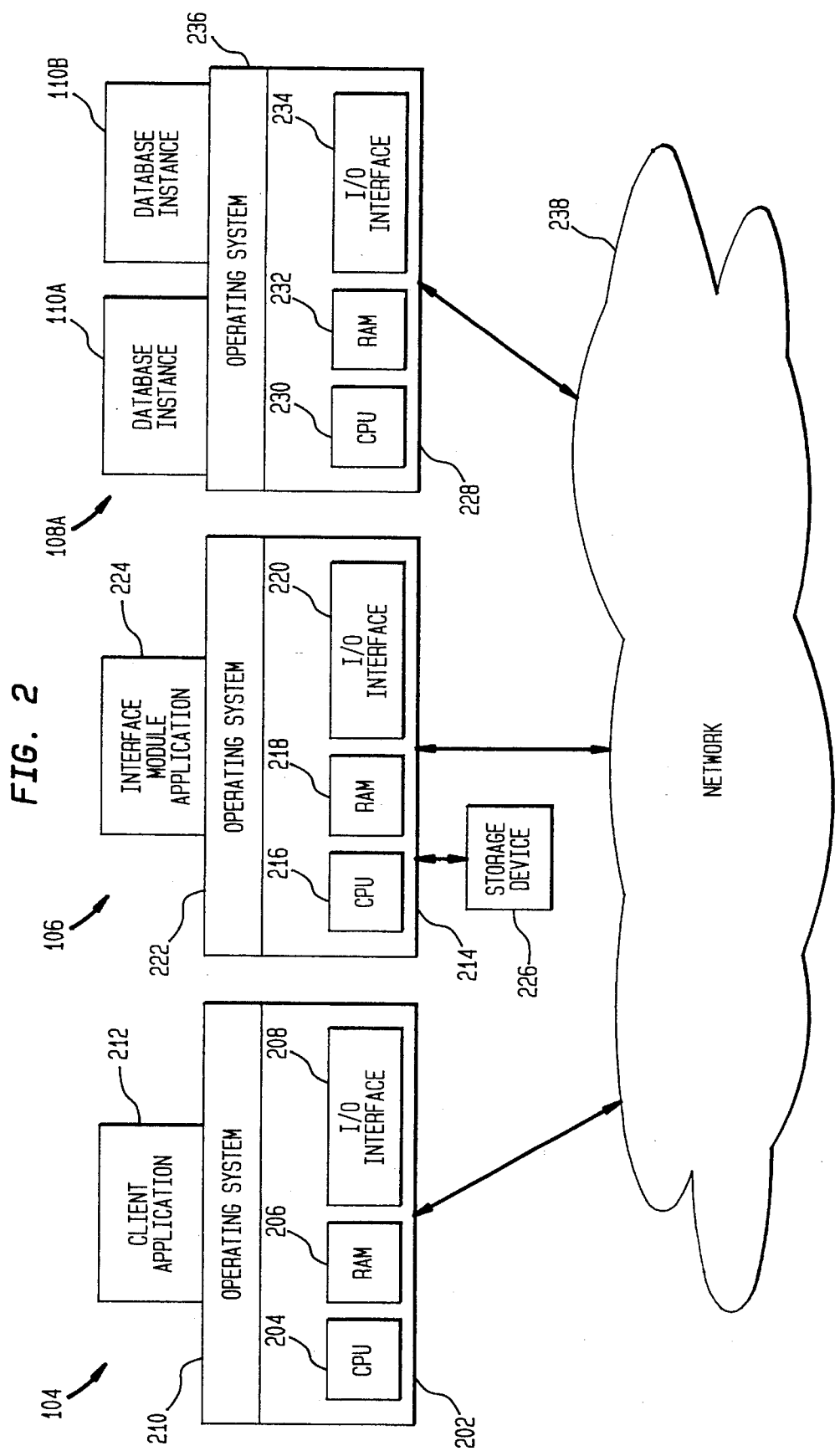
FIG. 2 is a high level block diagram of the environment of the present invention

Referring to FIG. 2, the client 104 is preferably implemented as a client application program 212 operating on a computer platform comprising a computer 202 and an operating system 210. The computer 202 includes various hardware components, such as one or more central processing units (CPU) 204, a random access memory (RAM) 206, and an input/output (I/O) interface 208. The client application program 212 includes instructions for defining and manipulating data in databases maintained by the database instances 110A–110F. The operating system 210 may be implemented using any well known operating system suitable for executing the client application program 212, such as DOS, DOS/Windows, AIX, OS/2, HP-UX, and Sun OS. The computer 202 may be implemented using any well known computers that support these operating systems. It should be understood, however, that other computers and operating systems could alternatively be used without departing from the scope and spirit of the present invention.

The interface module 106 is preferably implemented as an interface module application program 224 (preferably written in the C computer programming language) operating on a computer platform comprising a computer 214 and an operating system 222. The interface module application program 224, when executed, enables the computer 214 to perform the features of the interface module 106 discussed herein. Thus, the interface module application program 224 could be considered a controller of the computer 214.

The computer 214 includes various hardware components, such as one or more central processing units (CPU) 216, a random access memory (RAM) 218, and an input/output (I/O) interface 220.

Preferably, the computer 214 is the well known RISC System/6000 family of computers produced by IBM. Alternatively, the computer 214 is any computer that can run DB2 (produced by IBM). The operating system 222 is preferably the well known AIX operating system produced by IBM. It should be understood, however, that other computers and operating systems could alternatively be used without departing from the scope and spirit of the present invention.

The computer 214 is connected to a number of peripheral devices, such as one or more storage devices. The storage devices may represent floppy drive units, hard drive units, tape backup units, etc. One such storage device, designated using reference number 226, is shown in FIG. 2. A computer program product comprising a computer readable media having computer program logic recorded thereon, wherein the computer program logic when executed in the computer 214 enables the computer 214 to perform the functions of the present invention, may be read by and/or stored on the storage device 226. The computer program logic may then be loaded into the RAM 218, and executed by the CPU 216 of the computer 214. When executing in the CPU 216, the computer program logic is represented by the interface module application program 224 as shown in FIG. 2.

As stated above, the database instances 110A–110F execute on a plurality of servers 108A–108C. Server 108A is shown in FIG. 2 (servers 108B and 108C are similar to server 108A). The server 108A is preferably implemented as a computer platform comprising a computer 228 and an operating system 236. The computer 228 includes various hardware components, such as one or more central processing units (CPU) 230, a random access memory (RAM) 232, and an input/output (I/O) interface 234. The operating system 236 may be implemented using any well known operating system suitable for executing the database instances 110A and 110B, such as MVS, VM, VSE, OS/400, OS/2, AIX, HP-UX, SUN OS, etc. The computer 228 may be implemented using any well known computers that support these operating systems. It should be understood, however, that other computers and operating systems could alternatively be used without departing from the scope and spirit of the present invention.

The computers 202, 214, and 228 are connected to a communication network 238, which may be implemented as a local area network (LAN) or a wide area network (WAN), for example. The client 104, interface module 106, and database instances 110A–110F communicate with each other over this network 238.

3. Detailed Description of the Query Optimizer

Referring again to FIG. 1, the interface module 106 includes a query optimizer 120. The query optimizer 120 is a software module that enables, in accordance with the present invention, maximal subquery push down in the distributed, heterogeneous database system 102. The query optimizer 120 maintains a record of information concerning each database within the distributed, heterogeneous database system 102. The record of information is built and updated off-line. In a preferred embodiment, the query optimizer automatically builds and updates the record of information. In an alternate embodiment, the data can be expressed as a function vector, which in turn can be stored in the record of information manually, ready to be used by the query optimizer 120. The record of information is also commonly referred to as a system catalog or as metadata. Those skilled in the art will readily appreciate the various techniques that can be used to build this record of information.

It should be understood that embodiments of the present invention can be implemented in hardware, software or a combination thereof. In such embodiments, the various components and steps would be implemented in hardware and/or software to perform the functions of the present invention. Any presently available or future developed computer software language and/or hardware components can be employed in such embodiments of the present invention. Additionally, as should be readily apparent to a person skilled in the art, the query optimizer 120 can be a single software module or multiple software modules interconnected to perform the desired function.

The present invention preferably operates using to two types of information: data and capabilities. Thus, the record of information includes the type of data stored in each of the databases 110 and what functions or capabilities each database 110 can perform. Note that conventional metadata includes information concerning data, statistics, etc. However, the database capabilities are not traditionally part of the metadata. The present invention contemplates including the capabilities of the database instances 110 as part of the metadata or storing the capabilities of the database instances 110 in a separate data structure.

Based on the record of information, the query optimizer 120 generates, as discussed below, an optimal query plan. The query plan indicates whether the entire query can be forwarded (i.e., pushed down) to a particular database instance 110 or whether only part of the query (i.e., a subquery) can be forwarded to a particular database instance 110. Note that the term pushed down will be used for the remainder of this document to mean a query or subquery forwarded to a single database instance 110 and all of the requested functions of the query or subquery are performed by the single database instance.

FIG. 3 illustrates a high level flow diagram of the push down query procedure 300 implemented in accordance with the present invention. The operation of the push down query procedure is described with reference to FIG. 1. Note that FIG. 3 only refers to a query generally. As described below in more detail with reference to FIG. 4, the present invention contemplates evaluating subqueries within the query to determine whether a subquery can be pushed down to a database instance 110. FIG. 3 applies equally to queries and subqueries.

Initially, the interface module 106 receives a query from the client 104, as shown in block 310. As stated above, the query is an SQL statement that defines data located with one or more database instances 110 and delineates one or more functions to be performed on the data. As shown in block 320, procedure 300 determines whether all the requested data is located within a single database instance 110 (e.g., database instance 110A). If all the requested data is not found in a single database instance, and thus the query cannot be pushed down to a database instance 110, the procedure flows to block 340. Block 340 indicates that the query is processed. That is, the query is handled similarly to conventional techniques. Namely, the data is requested from the different database instances 110 and returned to the interface module 106. The interface module 106 then performs the desired function on the returned data.

Procedure 300 advances to decisional block 330 if all the requested data is located within a single database instance 110. Decisional block 330 determines whether the single database instance can perform all the requested functions. If the database instance can handle all the requested functions, then the query is pushed down to the database instance, as shown in block 350. The database instance then performs the requested function and returns the result (e.g., a table) to the interface module 106. The interface module in turn forwards the result to the client 104. Conversely, if the database instance cannot perform all of the requested functions then procedure 300 proceeds to block 340. Block 340, as described above, processes the query.

As outlined above, procedure 300 is a two step process: (1) does a single database instance contain all the requested data, and (2) can the same single database instance perform all the requested functions. If either one of these inquiries fails, the query is not pushed down to the database instance 110.

Figure 4A:
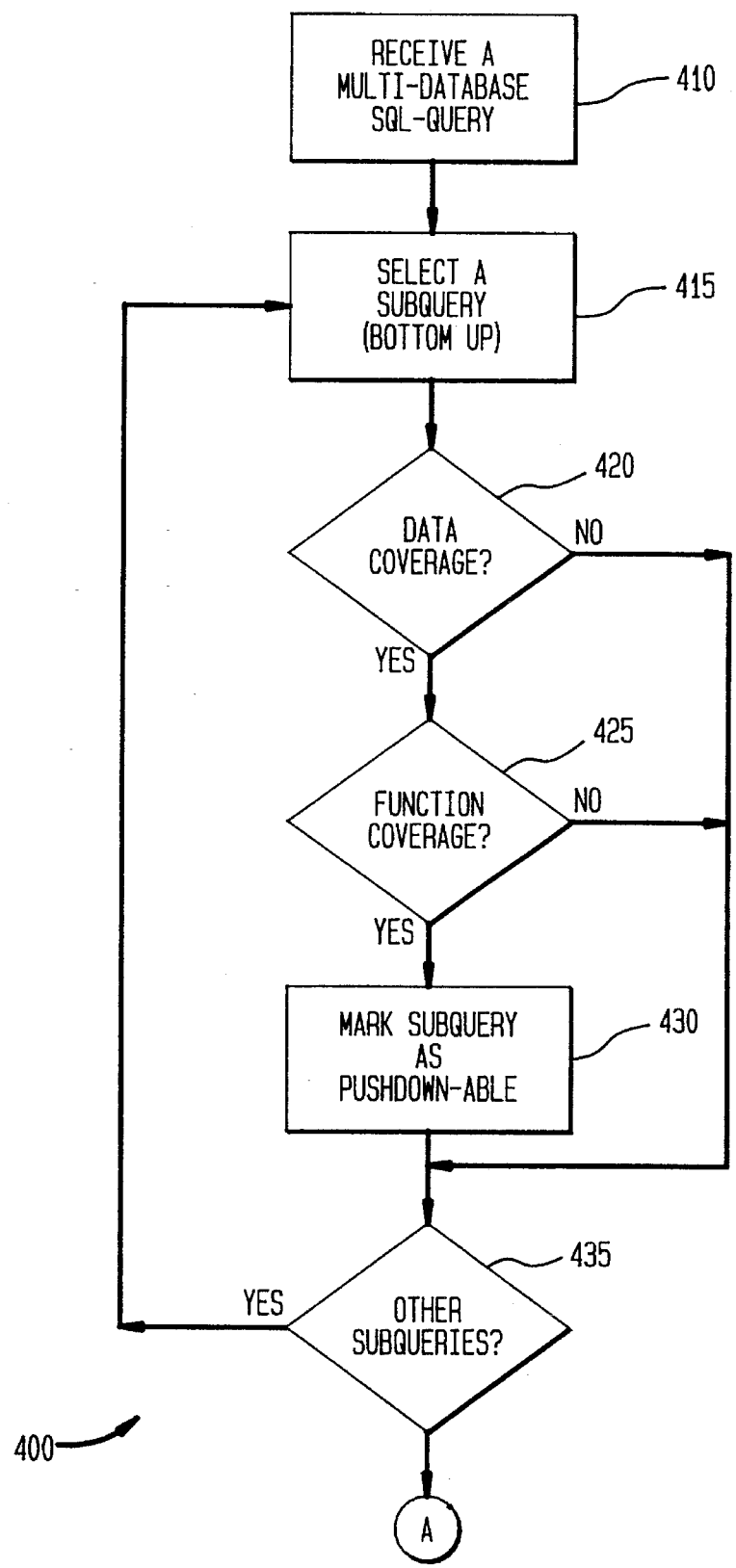
FIGS. 4A and 4B is a detailed flow diagram of a procedure for pushing down a query or subqueries to a database instance.
Figure 4B:
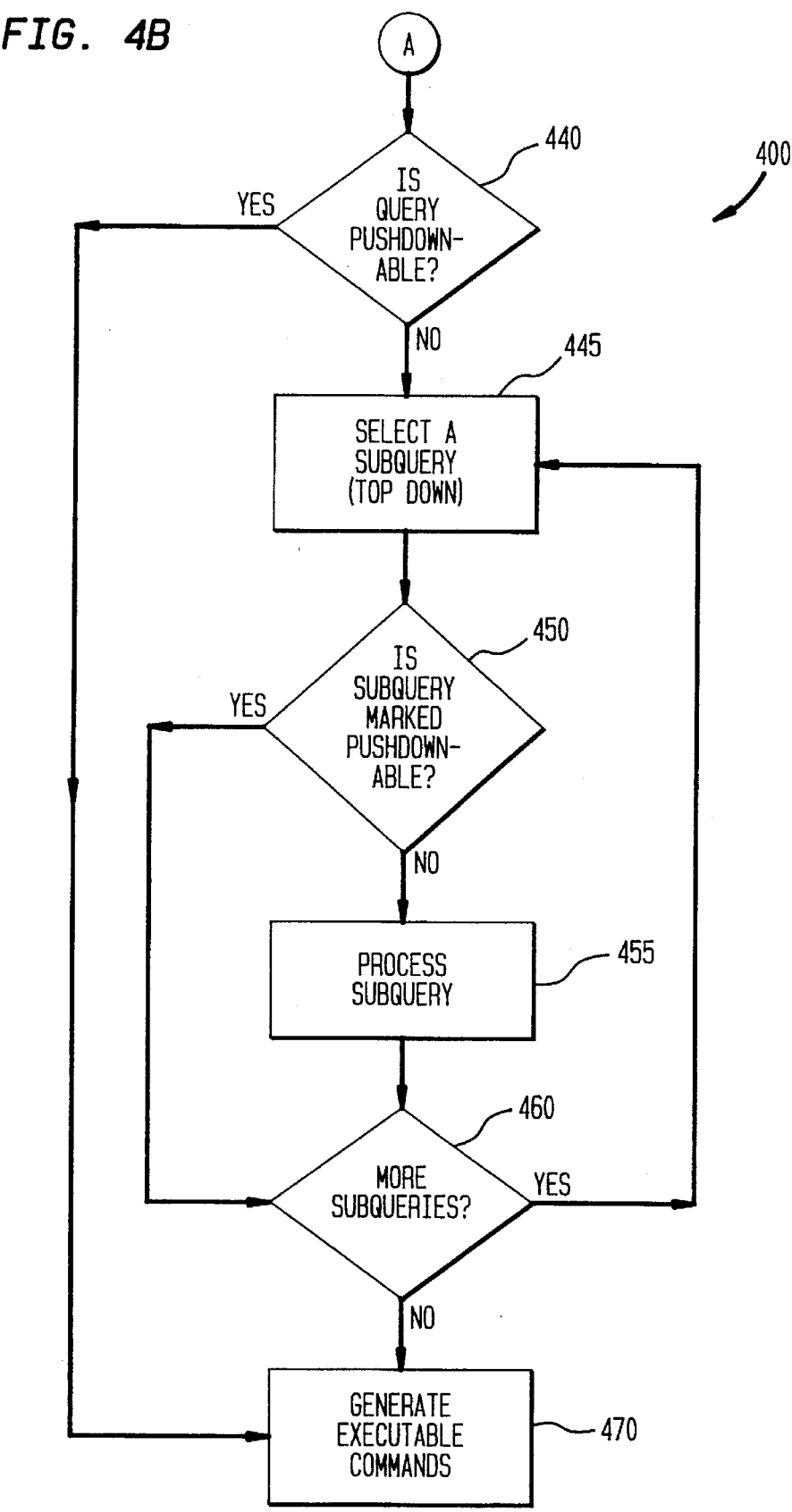

FIGS. 4A and 4B shows a detailed flow diagram illustrating the preferred embodiment of the present invention. That is, FIGS. 4A and 4B depict the procedure of determining whether a complete query or a subquery can be pushed down to execute on a remote server 108 having stored therein a database instance 110. Table 1 shows a standard SQL query having two subqueries.

TABLE 1

(1) SELECT EMPNO, LASTNAME, WORKDEPT
(2) FROM DSN8230.EMP X
(3) WHERE SALARY < (SELECT AVG(SALARY)
(4)     FROM SDN8230.EMP
(5)     WHERE WORKDEPT = X.WORKDEPT)

As stated above, a query can have multiple subqueries. Each subquery can include search conditions of its own, and these conditions can, in turn, include subqueries. Thus, an SQL statement can contain a hierarchy of subqueries. Those elements of the hierarchy that contain subqueries are said to be at a higher level than the subqueries they contain.

For the sake of brevity, and because SQL is well known in the art, a detailed description will not be given of the exact interpretation of the SQL query shown in Table 1. The example shown in TABLE 1 selects employees who make less than the average salary for their department. As stated above, the example in TABLE 1 has two subqueries. The first subquery (bottom-up) is shown at line (5). Subqueries typically start with a SELECT clause. A SELECT clause specifies the columns of the final result table. Thus, "SELECT AVG(SALARY)" starts the first subquery. The second subquery is shown at line (1) and starts with "SELECT EMPNO, LASTNAME, WORKDEPT." A further discussion of TABLE 1 with reference to the present invention is given below.

Referring to FIG. 4A, a multi-database SQL query is received from the client 104, as shown in block 410. The multi-database SQL query may contain multiple subqueries, as described above. The multi-database SQL query is push down-able to a database instance 110 if all its subqueries contained therein are also push down-able. Thus, in order to determine whether a query is push down-able all subqueries must first be checked for push down-ability.

Similar to a query, subqueries can also contain multiple subqueries. Whether a subquery can be pushed down to a database instance 110 depends on all subqueries enclosed within. Thus, the push down procedure 400 checks the subqueries bottom-up, which means that the innermost subquery will be examined first. This step is shown in block 415.

Next, the selected subquery is checked for data coverage, as shown in block 420. A subquery can only be pushed down if all the data that is requested by the subquery is located within a single database instance 110. For example, if the subquery referenced tables found in two separate database instances, for example 110A and 110B, then the subquery cannot be pushed down. Procedure 400 proceeds directly to block 435 if a single database instance does not cover all the data requirements of the subquery. Block 435 determines whether there are additional subqueries to check for push down-ability. If there are additional subqueries to check, procedure 400 advances back to block 415. Block 415 selects the next subquery from the bottom-up.

Procedure 400 proceeds to decisional block 425 if data coverage is satisfied. Decisional block 425 checks a selected subquery for function coverage. That is, does the database instance that contains all the requested data provide all the functionality required by the subquery. In order to determine whether a given database instance contains all the required functionality, a function vector is constructed for each subquery. The function vector indicates which functions are involved in a given subquery. This function vector will then be checked against the function vector for a particular database instance 110. The function vector is included in the record of information stored within the interface module 106 for each database instance 110.

Block 425 is performed to determine whether all functions referenced in the subquery are supported by the database instance 110. For example, if a given subquery involved an inner join between two tables located in database instance 110C, and the database instance 110C does not support the inner join operation, the subquery cannot be pushed down to the database instance 110C. In this scenario, procedure 400 proceeds directly to block 435 (described above).

If both data coverage and function coverage are satisfied the subquery is push down-able and is thus marked as such, as shown in block 430. The process described above is performed for all the subqueries in the original query; each push down-able subquery being appropriately marked. Note that the original query is push down-able only if all the subqueries contained therein are push down-able.

FIG. 4B continues the push down procedure 400. Specifically, FIG. 4B uses the results of the processing done in FIG. 4A and determines the largest subquery that can be pushed down to a single database instance 110.

Block 440 determines whether the original query is push down-able. This, of course, is the ideal situation. As described above, the original query can only be pushed down if all subqueries within the query are push down-able. If the original query is push down-able then procedure 400 proceeds to block 470. Block 470 is described in detail below.

If the original query is not push down-able then procedure 400 proceeds to block 445. Block 445 selects a subquery top-down. That is, starting from the top most subquery in the query, procedure 400 checks to determine whether that subquery has been marked as push down-able. Once a subquery has been found that is push down-able, the other subqueries contained therein do not have to be checked. Thus, procedure 400 ensures that the highest push down-able ancestor subquery will get pushed down together with all enclosed push down-able subqueries. If a subquery is not push down-able the next subquery is checked until all subqueries from the original query have been checked.

In particular, block 450 determines whether a subquery has been marked as push down-able. If the subquery is not push down-able, then the subquery is processed similar to conventional processing of a query or subquery, as shown in block 455. In essence, procedure 400 takes note that this subquery is not push down-able and passes this information to block 470. Block 470 generates executable commands for both push down-able queries and subqueries and for subqueries that are not push down-able.

Execution of subqueries that are not push down-able is analogous to conventional techniques. That is, the data referenced in the subquery is requested from the different database instances 110 and returned to the interface module 106. The interface module 106 then performs the desired function on the returned data. Alternately, the interface module 106 can forward the referenced data to a database instance that can perform the desired function or capability.

Processing the subquery may include determining a sequence of internal operations for its execution. In this process, the interface module 106 tries to select an optimal sequence. Optimization is especially important when an INSERT, UPDATE, DELETE, or SELECT SQL statement is being processed. When it optimizes such statements, the interface module 106 can use, among other information, statistics recorded in the catalog (or metadata) for the base tables and a knowledge of the indexes for those tables. The sequence of operations to retrieve the requisite rows from those tables is called the statements access path. Two different SQL statements that produce the same result can have very different access paths.

The process of selecting an optimal sequence for executing the subquery can also be performed during the generation of the executable commands (block 470).

Block 460 determines whether there are any more subqueries in the original query. Procedure 400 returns to block 445 if there are additional subqueries to be processed.

Finally, the procedure 400 proceeds to block 470. Block 470 generates executable commands to be forwarded to the database instance 110. The executable commands are generated by the interface module 106. The executable commands are similar to conventional executable commands that are sent from a conventional interface module to a database instance 110. Generation of executable commands is similar to compiling a high level source language (e.g., Cobol, Fortran) into assembly language. Generation of executable commands from a set of high level SQL commands is well known in the art, and for the sake of brevity will not be described in detail herein.

From process 400, the interface module 106 receives two types of information: (1) the largest subqueries that can be pushed down, and (2) the subqueries that cannot be pushed down. Based on this information, the executable commands are generated.

The first type of executable commands generated by interface module 106 is for push down-able subqueries. The first type of executable commands include a data reference and the specified functions to be performed by the database instance 110 on that data. In essence, the interface module 106 takes the SQL query or SQL subquery and compiles it into an executable command (or SQL dialect) used by the database instance 110.

The second type of executable commands generated by interface module 106 is for subqueries that cannot be pushed down. These executable commands are similar to commands conventionally generated for SQL queries. First, the SQL query or subquery must be decomposed into smaller, more manageable pieces. These pieces are then assembled along with additional "glue" commands. Essentially, "glue" commands are functions that are to be performed by the interface 106. Since the database instances may not be able to perform a specified function, the interface module 106 must add additional commands to the executable command set.

These additional commands provide guidance to the interface module 106 for handling data returned from the database instances. That is, the glue commands indicate what function to perform on the returned data. Additionally, the glue commands may instruct the interface module 106 to forward the returned data to a separate processing engine (e.g., another database instance 110) for performance of the requested function.

The first type and the second type of executable commands are assembled together and executed. The present invention allows some commands (i.e., push down-able queries and subqueries) to be performed in a more expedient manner than conventional techniques for executing an SQL query.

By way of example, procedure 400 is now described with reference to TABLE 1. The query shown in TABLE 1 is generated by the client 104 and forwarded to the interface module 106. Starting from the bottom of the query, the first subquery is checked for data coverage. Only one table (i.e., DSN8230.EMP) is referenced and this table is located within a single database instance. As such, data coverage is satisfied.

Next, procedure 400 checks for function coverage. The first subquery performs the function average (AVG). Function coverage is satisfied if the same database instance that contains the DSN8230.EMP table can perform the averaging function. Otherwise, function coverage is not satisfied.

If both data coverage and function coverage are satisfied, the first subquery is marked as push down-able. Otherwise the first subquery cannot be marked as push down-able and will have to be decomposed and assembled with glue commands during the generation of execution commands.

Next, the second subquery is checked for data coverage and function coverage. The second subquery has data coverage with the first subquery because the same table is referenced. Since no additional function is referenced in the second subquery, function coverage is also satisfied. Thus, the entire query can be marked as push down-able.

Had the first subquery not been push down-able because the database instance having stored therein the referenced table did not have an averaging capability, then the second subquery would also not be push down-able. That is, a subquery cannot be pushed down if it contains another subquery that is not push-down able.

In contrast, it is possible for the first subquery to be push down-able, but the second subquery to not be push-down able. For example, had the database instance storing the referenced table not been capable of performing a function referenced in the second subquery (bottom up) shown in TABLE 1, then function coverage would not have been satisfied. The first subquery, however, would not be affected by the second subquery not satisfying function coverage, and thus is still push down-able.

While the invention has been particularly shown and described with reference to preferred embodiments thereof, it will be understood by those skilled in the art that various changes in form and details may be made therein without departing from the spirit and scope of the invention.

Having thus described our invention, what we claim as new and desire to secure by Letters Patent is:

1. In a heterogeneous, distributed database system having a plurality of database instances, a computer-based method of optimizing performance of the database system by determining whether a query can be pushed down to a single database instance, comprising the steps of:

(1) evaluating the query for data coverage by determining whether all data referenced in the query is located within a single database instance;

(2) evaluating the query for capability coverage by determining whether all capabilities referenced in the query can be performed by said single database instance; and (3) pushing down the query to the single database instance if said data coverage and said capability coverage are satisfied.

2. The method of claim 1, further comprising the step of receiving the query from a host computer that permits a user to access data in the heterogeneous, distributed database system using Structured Query Language (SQL).

3. The method of claim 2, further comprising the step of performing steps (1) through (3) on subqueries within the query.

4. A computer-based method for optimizing performance of a heterogeneous, distributed database system comprising a plurality of heterogeneous database instances, wherein data associated with a client is distributed among said heterogeneous database instances, comprising the steps of:

(1) receiving a query from a host computer, wherein said query has one or more subqueries contained therein;

(2) evaluating said query bottom-up to determine whether each of said one or more subqueries satisfies a data coverage criteria and a capability coverage criteria, wherein said data coverage criteria requires all data referenced in a particular subquery to be located within a single database instance and said capability coverage criteria requires that said single database instance perform all capabilities referenced in said particular subquery;

(3) marking said one or more subqueries as push down-able if said data coverage criteria and said capability coverage criteria are satisfied; and (4) evaluating said query top-down to determine which subqueries have been marked by step (3) in order to determine whether said query in its entirety or said one or more subqueries can be pushed down to said single database instance, whereby said top down evaluation of said query ensures that the highest push down-able ancestor subquery will get pushed down together with all enclosed push down-able subqueries.

5. The method of claim 4, further comprising the step of generating a set of execution commands to be forwarded to the heterogeneous, distributed database system, wherein said set of execution commands include a first subset of commands directed to said query or said one or more subqueries that can be pushed down and a second subset of commands directed to said one or more subqueries that cannot be pushed down.

6. The method of claim 4, further comprising the step of decomposing said one or more subqueries that cannot be pushed down into manageable execution commands that can be executed by said plurality of heterogeneous database instances.

7. A computer-based system for optimizing performance of a heterogeneous, distributed database system, comprising:

a plurality of heterogeneous database management systems, wherein data associated with a client is distributed among said heterogeneous database management systems;

an interface module configured to receive a query from a host computer and to translate said query for transfer to said heterogeneous database management systems, said query having one or more subqueries contained therein, wherein said interface module is configured to provide a host computer with transparent access to the heterogeneous database management systems, said interface module comprising, means for performing a bottom-up evaluation of said query to determine whether each of said one or more subqueries satisfies a data coverage criteria and a capability coverage criteria, wherein said data coverage criteria requires all data referenced in a particular subquery to be located within a single database instance and said capability coverage criteria requires that said single database instance perform all capabilities referenced in said particular subquery;

means for marking said one or more subqueries as push down-able if said data coverage and said capability coverage are satisfied; and means for performing a top-down evaluation of said query to determine which subqueries have been marked push down-able in order to determine whether said query in its entirety or said one or more subqueries can be pushed down to said single database instance, whereby said top down evaluation of said query ensures that the highest push down-able ancestor subquery will get pushed down together with all enclosed push down-able subqueries.

* * * * *

UNITED STATES PATENT AND TRADEMARK OFFICE
CERTIFICATE OF CORRECTION

PATENT NO. : 5,588,150

DATED : December 24, 1996

INVENTORS : Lin *et al.*

It is certified that an error appears in the above-identified patent and that said Letters Patent is hereby corrected as shown below.

At column 4, line 26, change "110A 110F" to --110A-110F--.

At column 6, line 31, delete " to".

At column 11, line 24, change "the single" to --said single--.

Signed and Sealed this

Thirteenth Day of May, 1997

BRUCE LEHMAN

*Attest:*

*Attesting Officer*   *Commissioner of Patents and Trademarks*